United States Patent
Prabhakar et al.

(10) Patent No.: US 10,801,361 B2
(45) Date of Patent: Oct. 13, 2020

(54) SYSTEM AND METHOD FOR HPT DISK OVER SPEED PREVENTION

(71) Applicant: GENERAL ELECTRIC COMPANY, Schenectady, NY (US)

(72) Inventors: Nagamohan Govinahalli Prabhakar, Karnataka (IN); Steven Andrew Strang, Loveland, OH (US); Charles Stanley Orkiszewski, Cincinnati, OH (US); Subramanya Shankar, Karnataka (IN); Nitesh Jain, Karnataka (IN); Michael Riehle, West Chester, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 1180 days.

(21) Appl. No.: 15/260,641

(22) Filed: Sep. 9, 2016

(65) Prior Publication Data

US 2018/0073388 A1    Mar. 15, 2018

(51) Int. Cl.
| | |
|---|---|
| *F01D 21/04* | (2006.01) |
| *F01D 11/00* | (2006.01) |
| *F01D 5/30* | (2006.01) |
| *F01D 21/02* | (2006.01) |
| *F02K 3/06* | (2006.01) |

(52) U.S. Cl.
CPC ............ *F01D 21/045* (2013.01); *F01D 5/30* (2013.01); *F01D 11/001* (2013.01); *F01D 21/02* (2013.01); *F02K 3/06* (2013.01); *F05D 2220/32* (2013.01); *F05D 2230/10* (2013.01); *F05D 2240/30* (2013.01); *F05D 2270/021* (2013.01)

(58) Field of Classification Search
CPC ........ F01D 21/045; F01D 21/04; F01D 21/02; F01D 21/20
USPC ............................................................ 415/1
See application file for complete search history.

(56) References Cited

U.S. PATENT DOCUMENTS

| | | | | |
|---|---|---|---|---|
| 2,966,333 | A | * | 12/1960 | Flanagan ............... F01D 21/006 416/2 |
| 3,006,355 | A | | 10/1961 | Albert |
| 3,048,364 | A | | 8/1962 | Henry, Jr. et al. |
| 3,989,407 | A | * | 11/1976 | Cunningham ........ F01D 21/045 415/1 |
| 4,270,345 | A | | 6/1981 | Cast |
| 4,274,255 | A | | 6/1981 | Pollack |
| 4,276,744 | A | | 7/1981 | Pisano |
| 4,296,601 | A | | 10/1981 | Martin |
| 4,302,931 | A | | 12/1981 | White et al. |

(Continued)

FOREIGN PATENT DOCUMENTS

| | | |
|---|---|---|
| EP | 0060168 A1 | 9/1982 |
| EP | 0086710 A1 | 8/1983 |

(Continued)

*Primary Examiner* — Ninh H. Nguyen
*Assistant Examiner* — Jason Mikus
(74) *Attorney, Agent, or Firm* — Dinsmore & Shohl LLP

(57) ABSTRACT

The turbine assembly includes a shaft, a plurality of rotor disks, a plurality of blades, and at least one cutting mechanisms. The rotor disks are spaced axially along, and coupled to, the shaft and include a radially outer portion. The blades are spaced circumferentially around the radially outer portion. The cutting mechanisms are configured to cut the blades from the rotor disk during a disk over speed condition.

16 Claims, 3 Drawing Sheets

(56) References Cited

U.S. PATENT DOCUMENTS

| | | |
|---|---|---|
| 4,326,376 A | 4/1982 | Stearns et al. |
| 4,327,294 A | 4/1982 | Smith et al. |
| 4,337,615 A | 7/1982 | LaCroix |
| 4,344,141 A | 8/1982 | Yates |
| 4,422,287 A | 12/1983 | Stearns et al. |
| 4,432,201 A | 2/1984 | Hawes |
| 4,442,667 A | 4/1984 | MacIsaac |
| 4,449,360 A | 5/1984 | Evans |
| 4,467,599 A | 8/1984 | Moore |
| 4,470,257 A | 9/1984 | Wescott |
| 4,503,670 A | 3/1985 | Francois et al. |
| 4,522,025 A | 6/1985 | Greune et al. |
| 4,522,026 A | 6/1985 | Peterson et al. |
| 4,528,812 A | 7/1985 | Cantwell |
| 4,532,763 A | 8/1985 | Pisano |
| 4,578,945 A | 4/1986 | Peck et al. |
| 4,590,759 A | 5/1986 | Blizzard |
| 4,593,523 A | 6/1986 | Hawes |
| 4,625,510 A | 12/1986 | Evans |
| 4,648,797 A | 3/1987 | Martin |
| 4,712,372 A | 12/1987 | Dickey et al. |
| 4,738,597 A | 4/1988 | D'Agostino et al. |
| 4,817,376 A | 4/1989 | Brocard et al. |
| 4,835,654 A | 5/1989 | Riley |
| 4,837,697 A | 6/1989 | Eisa et al. |
| 4,910,956 A | 3/1990 | Legore et al. |
| 4,987,737 A | 1/1991 | Cantwell |
| 4,998,949 A | 3/1991 | Cantwell |
| 5,012,637 A | 5/1991 | Dubin et al. |
| 5,083,277 A | 1/1992 | Shutler |
| 5,134,845 A | 8/1992 | Romano |
| 5,142,860 A | 9/1992 | Strange et al. |
| 5,157,918 A | 10/1992 | Maulat |
| 5,197,280 A | 3/1993 | Carpenter et al. |
| 5,274,558 A | 12/1993 | High et al. |
| 5,277,024 A | 1/1994 | Bissey et al. |
| 5,361,579 A | 11/1994 | Bachelder |
| 5,369,948 A | 12/1994 | Vertens et al. |
| 5,596,871 A | 1/1997 | Lenertz |
| 5,680,753 A | 10/1997 | Hollinger et al. |
| 5,732,546 A | 3/1998 | Pineo et al. |
| 5,761,895 A | 6/1998 | Chu et al. |
| 6,070,405 A | 6/2000 | Jerye et al. |
| 6,230,479 B1 | 5/2001 | Kawamura et al. |
| 6,282,882 B1 | 9/2001 | Dudd, Jr. et al. |
| 6,321,525 B1 | 11/2001 | Rogers |
| 6,328,526 B1 | 12/2001 | Seki et al. |
| 6,353,790 B1 | 3/2002 | Tsuzuki |
| 6,393,355 B1 | 5/2002 | Muramatsu |
| 6,401,446 B1 | 6/2002 | Gibbons |
| 6,434,473 B1 | 8/2002 | Hattori |
| 6,463,730 B1 | 10/2002 | Keller et al. |
| 6,619,027 B1 | 9/2003 | Busch |
| 6,718,749 B2 | 4/2004 | Saitoh et al. |
| 6,789,000 B1 | 9/2004 | Munson, Jr. |
| 6,895,325 B1 | 5/2005 | Munson, Jr. |
| 6,915,639 B1 | 7/2005 | Linebrink |
| 7,007,452 B1 | 3/2006 | Baryshnikov et al. |
| 7,484,924 B2 * | 2/2009 | Soupizon ............... F01D 21/02 415/9 |
| 8,057,160 B2 | 11/2011 | Bart et al. |
| 2002/0078693 A1 | 6/2002 | Maillard et al. |
| 2003/0126862 A1 | 7/2003 | Peplow et al. |
| 2004/0154385 A1 | 8/2004 | Acker |
| 2004/0187473 A1 | 9/2004 | Rowe |
| 2004/0210376 A1 | 10/2004 | Hartzheim |
| 2005/0144957 A1 | 7/2005 | Ackerman et al. |
| 2005/0147490 A1 | 7/2005 | Soucy |
| 2006/0042265 A1 | 3/2006 | Drob |
| 2007/0000230 A1 | 1/2007 | Jones |
| 2007/0006593 A1 | 1/2007 | Smith et al. |
| 2007/0214795 A1 | 9/2007 | Cooker et al. |
| 2008/0148726 A1 | 6/2008 | Halsey et al. |
| 2010/0005657 A1 | 1/2010 | Vactor et al. |
| 2010/0010721 A1 | 1/2010 | Vactor et al. |
| 2010/0088003 A1 | 4/2010 | Meacham |

FOREIGN PATENT DOCUMENTS

| | | |
|---|---|---|
| EP | 0573186 A2 | 12/1993 |
| EP | 0742355 A1 | 11/1996 |
| GB | 2084655 A | 4/1982 |
| GB | 2087978 A | 6/1982 |
| GB | 2095755 A | 10/1982 |
| GB | 2461609 A | 1/2010 |
| GB | 2462180 A | 2/2010 |
| JP | S56162228 A | 12/1981 |
| JP | S61286537 A | 12/1986 |
| JP | S62243934 A | 10/1987 |
| JP | S63205426 A | 8/1988 |
| JP | S63227933 A | 9/1988 |
| JP | H01271616 A | 10/1989 |
| JP | H01285627 A | 11/1989 |
| JP | H029919 A | 1/1990 |
| JP | H03138425 A | 6/1991 |
| JP | H0518272 A | 1/1993 |
| JP | H06221185 A | 8/1994 |
| JP | H0783074 A | 3/1995 |
| JP | H07301128 A | 11/1995 |
| JP | H0822304 A | 1/1996 |
| JP | H08218897 A | 8/1996 |
| JP | H09238499 A | 9/1997 |
| JP | H09287414 A | 11/1997 |
| JP | H09329037 A | 12/1997 |
| JP | H1089089 A | 4/1998 |
| JP | H10306733 A | 11/1998 |
| JP | 11303654 A | 11/1999 |
| JP | 2002138857 A | 5/2002 |
| JP | 2003148170 A | 5/2003 |
| JP | 2005069093 A | 3/2005 |
| JP | 2007002703 A | 1/2007 |
| JP | 2008111436 A | 5/2008 |
| JP | 2008169833 A | 7/2008 |
| WO | 1982000687 A1 | 3/1982 |
| WO | 1993006353 A1 | 4/1993 |
| WO | 2008081483 A1 | 7/2008 |
| WO | 2009016665 A1 | 2/2009 |

\* cited by examiner

SYSTEM AND METHOD FOR HPT DISK OVER SPEED PREVENTION

BACKGROUND

The field of the disclosure relates generally to gas turbine engines and, more particularly, to rotor over speed protection.

Gas turbine engines include a rotor assembly which is rotatable relative to stationary engine structures. The rotor assembly includes a plurality of stages, each including a rotatable disk and stationary vane assembly. Each disk and vane assembly includes a plurality of circumferentially spaced blades or vanes. Each stage is coupled to a rotor mounting structure on a shaft which is configured to drive a respective machine, such as a turbine. Hot combustion gases drive the rotor assembly through the blades. One known failure mechanism for the rotor assembly is disengagement of a portion of the disk from the rotor. Disengagement of aft stages occurs when an aft stage separates from the rotor mounting structure. The separated stage is still powered by the hot combustion gases, but the separated rotor disk stage can no longer transfer that power to the shaft. The separated stage may rotate significantly faster than it rotates during normal operations because it is unloaded and still receiving power input from the combustion gases, causing a disk over speed condition which may result in a failure of the structural integrity of the separated stage and ejection of parts of the rotor disk stage.

BRIEF DESCRIPTION

In one aspect, a rotatable machine is provided. The turbine assembly includes a shaft, a plurality of rotor disks, a plurality of blades, and at least one cutting mechanisms. The rotor disks are spaced axially along, and coupled to, the shaft and include a radially outer portion. The blades are spaced circumferentially around the radially outer portion. The cutting mechanisms are configured to cut the blades from the rotor disk during a disk over speed condition.

In another aspect, a turbofan engine is provided. The turbofan engine includes a multistage compressor, a shaft, and a turbine assembly. The shaft is coupled to the multistage compressor and the turbine assembly. The turbine assembly is configured to drive the multistage compressor through the shaft. The turbine assembly includes a shaft, a plurality of rotor disks, a plurality of blades, and at least one cutting mechanisms. The rotor disks are spaced axially along, and coupled to, the shaft and include a radially outer portion. The blades are spaced circumferentially around the radially outer portion. The cutting mechanisms are configured to cut the blades from the rotor disk during a disk over speed condition.

In yet another aspect, a method of severing at least one blade of a row of blades spaced circumferentially about a rotor disk of a turbine during an over speed condition of the rotor disk is provided. The method includes driving the rotor disk with engine combustion gases after a separation of the rotor disk from a shaft of the turbine. The method also includes translating the rotor disk axially along the shaft using the centrifugal force of the rotor disk. The method further includes engaging the rotor disk with at least one cutting mechanism. The method also includes severing at least some of the blades from the rotor disk using the cutting mechanism.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

Embodiments of a turbine assembly as described herein provide a system that can prevent a high pressure turbine rotor disk over speed condition. Specifically, the turbine assembly systems and methods described herein provide at least one cutting mechanisms that cut the turbine blades off the rotor disks when a rotor disk has become disengaged from a rotor mounting structure. The rotor disk is no longer able to translate energy from the hot combustion gases into rotational energy when the turbine blades have been cut off from the rotor disk. Removing the turbine blades removes the driving force of the turbine and prevents the development of a disk over speed condition.

Figure 1:
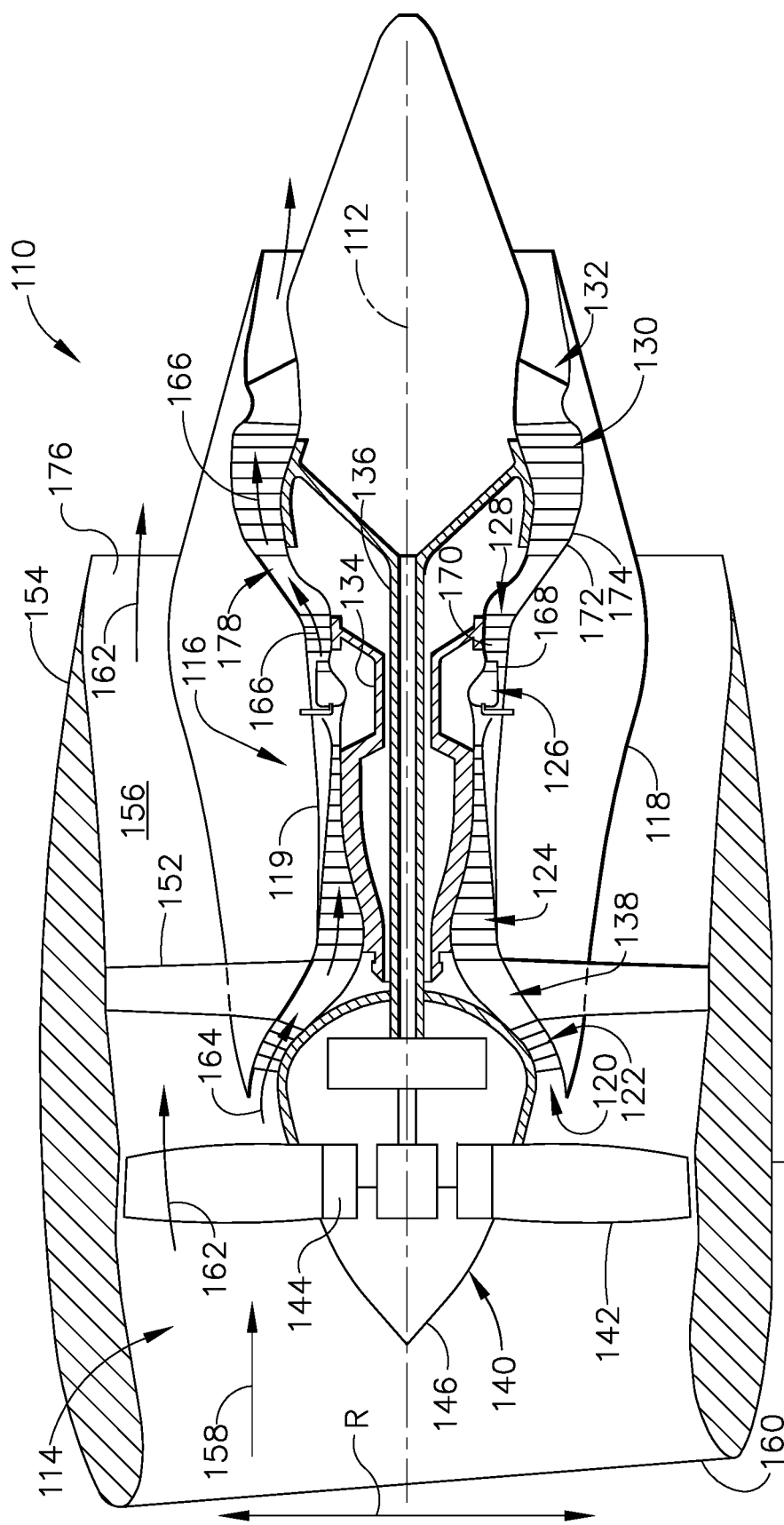
FIG. 1 is a schematic cross-sectional illustration of an exemplary gas turbine engine in accordance with an example embodiment of the present disclosure.

FIG. 1 is a schematic cross-sectional view of a gas turbine engine in accordance with an exemplary embodiment of the present disclosure. In the exemplary embodiment, the gas turbine engine is a high-bypass turbofan jet engine 110, referred to herein as "turbofan engine 110." As shown in FIG. 1, turbofan engine 110 defines an axial direction A (extending parallel to a longitudinal centerline 112 provided for reference) and a radial direction R (extending perpendicular to longitudinal centerline 112). In general, turbofan engine 110 includes a fan assembly 114 and a gas turbine engine 116 disposed downstream from fan assembly 114.

Gas turbine engine 116 includes a substantially tubular outer casing 118 that defines an annular inlet 120. Gas turbine engine 116 also includes a substantially tubular inner casing 119 circumscribed by outer casing 118. Inner casing 119 and outer casing 118 encase, in serial flow relationship, a compressor section including a booster or low pressure (LP) compressor 122 and a high pressure (HP) compressor 124; a combustion section 126; a turbine section including a high pressure (HP) turbine 128 and a low pressure (LP) turbine 130; and a jet exhaust nozzle section 132. A high pressure (HP) shaft or spool 134 drivingly connects HP turbine 128 to HP compressor 124. A low pressure (LP) shaft or spool 136 drivingly connects LP turbine 130 to LP compressor 122 and a fan 140. The compressor section, combustion section 126, turbine section, and exhaust nozzle section 132 together define an air flow path 138.

In the exemplary embodiment, fan assembly 114 includes fan 140 having a plurality of fan blades 142 coupled to a disk 144 in a spaced apart manner. As depicted, fan blades 142 extend outwardly from disk 144 generally along radial direction R. Fan blades 142 and disk 144 are together rotatable about longitudinal centerline 112 by LP shaft 136. Although described as a fan disk having a plurality of blades, for example, fan disk 144 and blades 142, fan assembly 114 may instead be formed with a blisk or integrally bladed rotor.

Referring still to the exemplary embodiment of FIG. 1, disk 144 is covered by rotatable front hub 146 aerodynamically contoured to promote an airflow through plurality of fan blades 142. Additionally, exemplary fan assembly 114 includes an annular fan casing or outer nacelle 150 that circumferentially surrounds fan 140 and/or at least a portion of gas turbine engine 116. It should be appreciated that nacelle 150 may be configured to be supported relative to gas turbine engine 116 by an outlet guide vane assembly 152. Moreover, a downstream section 154 of nacelle 150 may extend over an outer portion of gas turbine engine 116 so as to define a bypass airflow passage 156 therebetween.

During operation of turbofan engine 110, a volume of air 158 enters turbofan 110 through an associated inlet 160 of nacelle 150 and/or fan assembly 114. As air 158 passes across fan blades 142, a first portion of air 158 as indicated by arrows 162 is directed or routed into bypass airflow passage 156 and a second portion of air 158 as indicated by arrows 164 is directed or routed into air flow path 138, or more specifically into booster compressor 122. The ratio between first portion of air 162 and second portion of air 164 is commonly known as a bypass ratio. The pressure of second portion of air 164 is then increased as it is routed through HP compressor 124 and into combustion section 126, where it is mixed with fuel and burned to provide combustion gases 166.

Combustion gases 166 are routed through HP turbine 128 where a portion of thermal and/or kinetic energy from combustion gases 166 is extracted via sequential stages of HP turbine stator vanes 168 that are coupled to inner casing 119 and HP turbine rotor blades 170 that are coupled to HP shaft or spool 134, thus causing HP shaft or spool 134 to rotate, thereby supporting operation of HP compressor 124. Combustion gases 166 are then routed through LP turbine 130 where a second portion of thermal and kinetic energy is extracted from combustion gases 166 via sequential stages of LP turbine stator vanes 172 that are coupled to inner casing 119 and LP turbine rotor blades 174 that are coupled to LP shaft or spool 136, thus causing LP shaft or spool 136 to rotate, thereby supporting operation of booster compressor 122 and/or rotation of fan 140. Combustion gases 166 are subsequently routed through jet exhaust nozzle section 132 of gas turbine engine 116 to provide propulsive thrust. Simultaneously, the pressure of first portion of air 162 is substantially increased as first portion of air 162 is routed through bypass airflow passage 156, including through outlet guide vane assembly 152 before it is exhausted from a fan nozzle exhaust section 176 of turbofan engine 110, also providing propulsive thrust. HP turbine 128, LP turbine 130, and jet exhaust nozzle section 132 at least partially define a hot gas path 178 for routing combustion gases 166 through gas turbine engine 116.

It should be appreciated, however, that exemplary turbofan engine 110 depicted in FIG. 1 is by way of example only, and that in other exemplary embodiments, turbofan engine 110 may have any other suitable configuration. It should also be appreciated, that in still other exemplary embodiments, aspects of the present disclosure may be incorporated into any other suitable gas turbine engine. For example, in other exemplary embodiments, aspects of the present disclosure may be incorporated into, e.g., a turboprop engine, a military purpose engine, and a marine or land-based aero-derivative engine.

Figure 2:
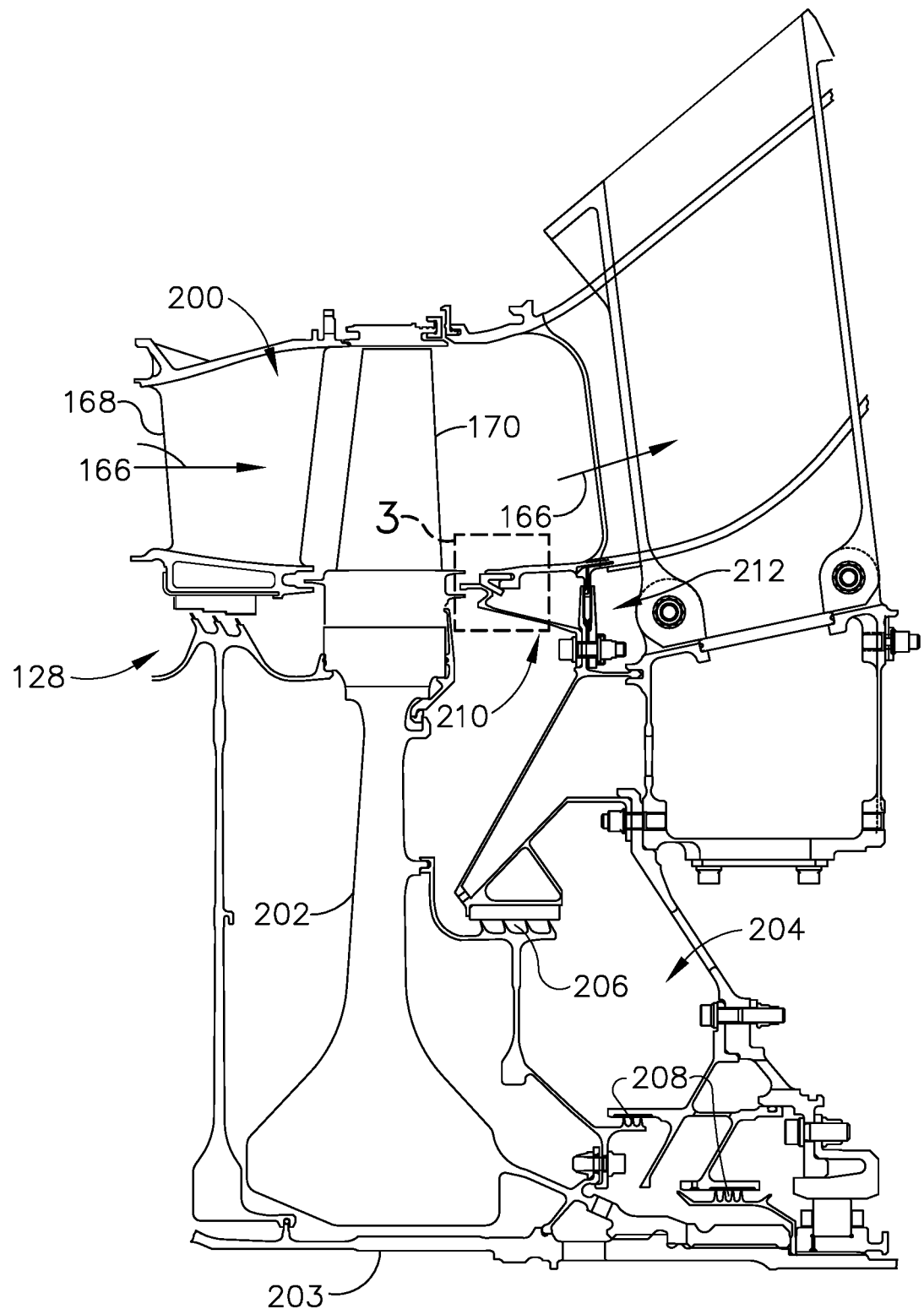
FIG. 2 is a schematic cross-sectional view of an exemplary high pressure turbine of the gas turbine engine shown in FIG. 1.

FIG. 2 is a schematic cross-sectional view of HP turbine 128 of turbofan engine 110 (shown in FIG. 1). HP turbine 128 includes stator vanes 168 coupled to inner casing 119 and a HP turbine rotor blades 170 coupled to a HP rotor mounting structure 203 through a HP turbine rotor disk 202. A second stage 200 of HP turbine 128 includes one HP turbine stator vane 168 and one HP turbine rotor blade 170. Second stage 200 of HP turbine 128 is typically coupled to a first stage (not shown) of HP turbine 128 through HP mounting structure 203. First stage of HP turbine is drivingly coupled to HP shaft 134. A HP turbine wheelspace 204 includes a plurality of seals, for example a first seal 206 and a second seal 208, radially arranged in series within wheelspace 204. First and second seals 206 and 208 are weakened seals configured to allow HP turbine rotor disk 202 to move aft in the event that HP turbine rotor disk 202 has become disengaged from HP rotor mounting structure 203 (hereinafter a "disengagement event"). At least one cutting mechanism 210 is coupled to a frame 212 and configured to cut HP turbine rotor blades 170 off of HP turbine rotor disk 202 during a disengagement event.

During normal operations, combustion gases 166 are routed through HP turbine 128 where a portion of thermal and/or kinetic energy from combustion gases 166 is extracted via sequential stages of HP turbine rotor blades 170 that are coupled to HP turbine rotor disk 202 and HP shaft or spool 134, thus causing HP shaft or spool 134 to rotate, thereby supporting operation of HP compressor 124. However, during an exemplary disengagement event, second stage 200 HP turbine rotor disk 202 may become disengaged from HP rotor mounting structure 203 allowing second stage 200 HP turbine rotor disk 202 to rotate without transmitting energy to HP shaft or spool 134. However, first stage of HP turbine 128 is still coupled to HP mounting structure 203 and is still driving HP compressor 126. Second stage 200 HP turbine rotor disk 202 is then driven to rotate substantially faster during a disengagement event because HP shaft or spool 134 and HP compressor are not providing resistance to slow down HP turbine rotor disk 202, causing a disk over speed condition.

In accordance with one embodiment of the invention, cutting mechanisms 210 are configured to cut HP turbine rotor blades 170 off of HP turbine rotor disk 202 during the disengagement event. Reactional forces cause HP turbine rotor disk 202 to translate aftward during the disengagement event. Seals 206 and 208 are weakened to allow HP turbine rotor disk 202 to translate axially aft during the disengagement event. Cutting mechanism 210 is configured to extend into the rotational path of HP turbine rotor blades 170 and cut off HP turbine rotor blades 170 during the disengagement event. The force driving HP turbine rotor disk 202 from combustion gases 166 is no longer present when HP turbine rotor blades 170 have been cut off from HP turbine rotor disk 202. Removing HP turbine rotor blades 170 eliminates the input power to rotor disk 202, thereby mitigating the disk over speed condition.

Figure 3:
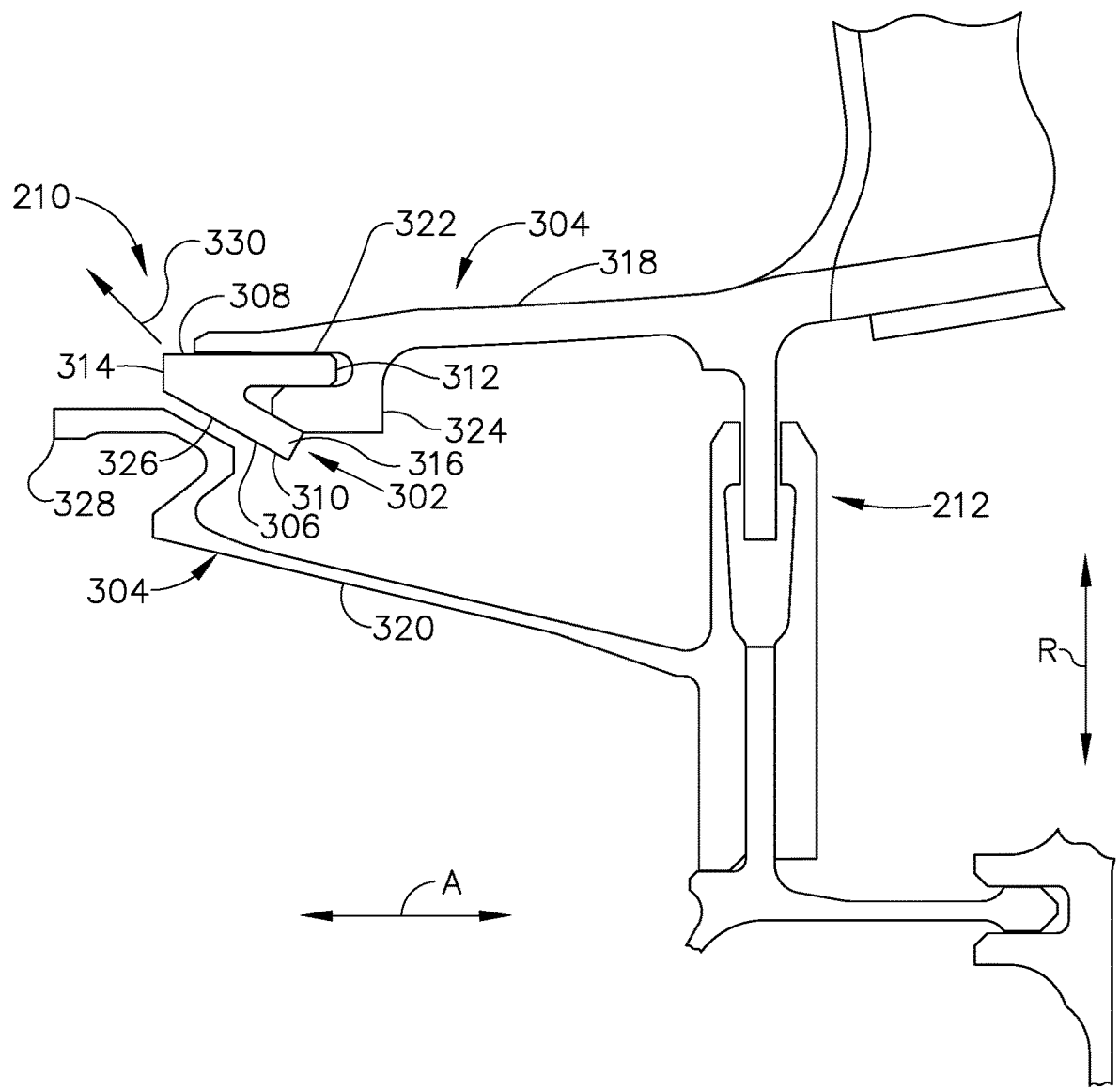
FIG. 3 is an enlarged view of a portion of FIG. 2 taken along area 3.

FIG. 3 is an enlarged view of FIG. 2 taken along area 3. FIG. 3 is a perspective view of cutting mechanism 210. Cutting mechanism 210 includes a wedge 302 and a wedge holder 304. Wedge 302 includes a triangular body 306 including a first side 308, a second side 310, and a third side 312. The intersection of first side 308 and second side 310 forms a cutting edge 314. Third side 312 includes a notch 316.

Wedge holder 304 is configured to hold wedge 302 in place and includes an upper arm 318 and a lower arm 320. Both upper and lower arms 318 and 320 are coupled to frame 212 and extend forward from frame 212 in axial direction A. Upper arm 318 includes a bottom side 322 and a notch engagement hook 324. Bottom side 322 engages first side 308 and prevents wedge 302 from moving outward in radial direction R. Notch engagement hook 324 engages notch 316 and prevents wedge 302 from moving aft in axial direction A. Lower arm 320 includes a second side engagement surface 326 and a disk engagement arm 328. Disk engagement arm 328 extends from second side engagement surface 326 which extends from lower arm 320. Second side engagement surface 326 engages wedge 302 along second side 310 and prevents wedge 302 from moving forward in axial direction A and inward in radial direction R.

During normal operations, wedge 302 is positioned out of the rotational path of HP turbine rotor blades 170. Second side engagement surface 326 is configured to maintain the normal operating position of wedge 302 by pressing triangular body 306 against bottom side 322 and notch engagement hook 324. During a disengagement event, HP turbine rotor disk 202 translates axially aft and presses against disk engagement arm 328 which, in turn, causes second side engagement surface 326 to press against triangular body 306. Pressure from second side engagement surface 326 against triangular body 306 causes wedge 302 to move into the rotational path of HP turbine rotor blades 170 as indicated by arrow 330. Cutting edge 314 cuts into HP turbine rotor blades 170 as HP turbine rotor blades 170 rotate. HP turbine rotor disk 202 no longer receives rotational energy from combustion gases 166 after rotor blades 170 have been cut off from HP turbine rotor disk 202. Wedge 302 is retained in the radial position by wedge holder 304 and wedge 302 is retained in the axial position by rotor blades 170 and wedge holder 304.

In the exemplary embodiment, HP turbine 128 includes twelve (12) cutting mechanisms 210 spaced circumferentially around frame 212, one cutting mechanism 210 located on each of the twelve (12) frame struts in gas turbine engine 116. However, HP turbine 128 may include any number of cutting mechanisms 210 which enables HP turbine 128 to operate as described herein. Additionally, cutting mechanism 210 are not required to be located on frame struts, cutting mechanism 210 maybe located on any equipment which allows cutting mechanisms 210 to operate as described herein.

The above-described embodiments of the turbine assembly provide a system that can mitigate a high pressure turbine rotor disk over speed condition. Specifically, the turbine assembly systems and methods described herein provide at least one cutting mechanism that cut the turbine blades off the rotor disks when a rotor disk has become disengaged from a rotor mounting structure. The rotor disk is no longer able to translate energy from the hot combustion gases into rotational energy when the turbine blades have been cut off from the rotor disk. Removing the turbine blades removes the driving force of the turbine and prevents the development of a disk over speed condition.

Exemplary embodiments of methods, systems, and apparatus for the turbine assembly are not limited to the specific embodiments described herein, but rather, components of the systems and/or steps of the methods may be utilized independently and separately from other components and/or steps described herein. For example, the methods may also be used in combination with other systems requiring preventing a disk over speed condition, and the associated methods, and are not limited to practice with only the systems and methods as described herein. Rather, the exemplary embodiment can be implemented and utilized in connection with many other applications, equipment, and systems that may benefit from preventing a disk over speed condition.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A rotatable machine comprising:
   a shaft;
   a rotor disk coupled to said shaft and having a radially outer portion;
   a plurality of blades spaced circumferentially around said radially outer portion; and
   at least one cutting mechanism configured to disengage at least some of said plurality of blades from said rotor disk during a disk over speed condition, the at least one cutting mechanism including a tapered wedge received in a wedge holder, wherein the wedge holder comprises an upper arm and a lower arm, the upper and lower arms configured to hold the wedge in a first location during a non-disk over speed condition and to reposition the wedge into a rotational path of the plurality of blades during a disk over speed condition.

2. The rotatable machine in accordance with claim 1, wherein said wedge comprises a sharp cutting edge configured to disengage at least some of said plurality of blades from said rotor disk.

3. The rotatable machine in accordance with claim 2 further comprising a plurality of seals configured to allow said rotor disk to translate aftward during a disk over speed condition.

4. The rotatable machine in accordance with claim 3, wherein said at least one cutting mechanism comprises twelve cutting mechanisms.

5. The rotatable machine in accordance with claim 1, wherein said lower arm comprises a disk engagement arm, said rotor disk configured to apply an axial force to said disk engagement arm during a disk over speed condition.

6. A turbofan engine comprising:
   a compressor;
   a shaft; and
   a turbine assembly coupled to said compressor through said shaft, said turbine assembly configured to drive said compressor through said shaft, said turbine assembly comprising:
   a plurality of rotor disks, each rotor disk comprising a radially outer portion and spaced axially along and coupled to said shaft;
   a plurality of blades spaced circumferentially around said radially outer portion; and
   at least one cutting mechanism configured to disengage said plurality of blades from said rotor disk during a disk over speed condition, the at least one cutting mechanism including a tapered wedge received in a wedge holder, wherein said wedge holder comprises an upper arm and a lower arm, the upper and lower arms configured to hold the wedge in a first location during a non-disk over speed condition and to reposition the wedge into a rotational path of the plurality of blades during a disk over speed condition.

7. The turbofan engine in accordance with claim 6, wherein said wedge comprises a sharp cutting edge configured to disengage said plurality of blades.

8. The turbofan engine in accordance with claim 7 further comprising a plurality of seals configured to allow a stage of said plurality of rotor disks to translate aftward during a disk over speed condition.

9. The turbofan engine in accordance with claim 8, wherein said wedge comprises a notch, said upper arm comprises a notch engagement hook, said notch engagement hook, said upper arm, and said lower arm are configured to hold said wedge in a first location during a non-disk over speed condition.

10. The turbofan engine in accordance with claim 8, wherein said at least one cutting mechanism comprises twelve (12) cutting mechanisms.

11. The turbofan engine in accordance with claim 6, wherein said lower arm comprises a disk engagement arm, a second stage of said plurality of rotor disks configured to press said disk engagement arm during a disk over speed condition.

12. A method of severing at least one blade of a row of blades spaced circumferentially about a rotor disk of a turbine during an over speed condition of the rotor disk, the method comprising:
   driving the rotor disk with engine combustion gases after a separation of the rotor disk from a shaft of the turbine;
   translating the rotor disk axially along the shaft using the centrifugal force of the rotor disk; engaging the rotor disk with at least one cutting mechanism and translating the at least one cutting mechanism into a rotational path of the row of blades; and
   severing at least some of the blades from the rotor disk using the cutting mechanism.

13. The method of claim 12, wherein the at least one cutting mechanism comprises a wedge.

14. The method of claim 12, wherein the rotor disk comprises a plurality of seals configured to permit the rotor disk to translate during a disk over speed condition.

15. The method of claim 13, wherein translating the wedge of the at least one cutting mechanism into the path of the plurality of blades further comprises translating a wedge holder into the wedge, wherein the wedge holder is configured hold the wedge.

16. The method of claim 13, wherein translating a wedge holder into the wedge further comprises translating the rotor disk into a disk engagement arm and a wedge engagement arm, the wedge engagement arm configured to translate the wedge into the path of the plurality of blades.

* * * * *